US007376227B2

United States Patent
Anisimov et al.

(10) Patent No.: US 7,376,227 B2
(45) Date of Patent: *May 20, 2008

(54) METHOD AND APPARATUS FOR INTEGRATING AGENT STATUS BETWEEN A CUSTOMER RELATIONS MANAGEMENT SYSTEM AND A MULTIPLE CHANNEL COMMUNICATIONS CENTER

(75) Inventors: Nikolay Anisimov, Concord, CA (US); Petr Makagon, San Francisco, CA (US); Herbert Willi Artur Ristock, Walnut Creek, CA (US); Andrey Ryabchun, San Francisco, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 10/993,837

(22) Filed: Nov. 18, 2004

(65) Prior Publication Data
US 2006/0029206 A1   Feb. 9, 2006

Related U.S. Application Data

(60) Provisional application No. 60/598,872, filed on Aug. 3, 2004.

(51) Int. Cl.
*H04M 3/00* (2006.01)
*H04M 1/64* (2006.01)
*H04M 11/00* (2006.01)
*H04M 5/00* (2006.01)

(52) U.S. Cl. .................. 379/265.03; 379/88.17; 379/93.09; 379/265.02; 379/265.09

(58) Field of Classification Search .......... 379/88.17, 379/93.01, 93.09, 265.01, 265.02, 265.09, 379/900, 265.03
See application file for complete search history.

(56) References Cited

U.S. PATENT DOCUMENTS

| | | | |
|---|---|---|---|
| 6,389,007 B1 | 5/2002 | Shenkman et al. | |
| 6,625,139 B2 | 9/2003 | Miloslavsky et al. | |
| 6,879,586 B2* | 4/2005 | Miloslavsky et al. | 370/356 |
| 6,958,994 B2* | 10/2005 | Zhakov et al. | 370/352 |
| 6,985,943 B2* | 1/2006 | Deryugin et al. | 709/224 |
| 7,221,377 B1* | 5/2007 | Okita et al. | 345/629 |
| 2003/0018702 A1* | 1/2003 | Broughton et al. | 709/202 |

OTHER PUBLICATIONS

U.S. Appl. No. 60/598,872, Nikolay Anisimov et al.

* cited by examiner

*Primary Examiner*—William J. Deane, Jr.
(74) *Attorney, Agent, or Firm*—Central Coast Patent Agency, Inc.

(57) ABSTRACT

A system for integrating a contact center, an agent station, and a customer relation management server for communication includes a network adapter node having port connection to the contact center, the agent station, and the customer relation management server; and one or more dynamic states running on the network adapter mode wherein the one or more states described represent current agent activity and presence attributes according to model. In preferred application the customer relation management server is adapted to deliver data and or services or notification of availability thereof to the agent station based on the current state information for one or more events active or in queue for the agent station.

29 Claims, 3 Drawing Sheets

METHOD AND APPARATUS FOR INTEGRATING AGENT STATUS BETWEEN A CUSTOMER RELATIONS MANAGEMENT SYSTEM AND A MULTIPLE CHANNEL COMMUNICATIONS CENTER

CROSS-REFERENCE TO RELATED DOCUMENTS

The present application claims priority to provisional patent application Ser. No. 60/598,872 filed on Aug. 3, 2004. Provisional patent application Ser. No. 60/598,872 is herby incorporated in its entirety by reference.

FIELD OF THE INVENTION

The present invention is in the field of telephony communications systems and customer relations management systems, and has particular application to methods including software for integrating functions of a customer relations management system and a communication center at the desktop of an agent of the center.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in call centers with computer hardware and software adapted for better routing of telephone calls, faster delivery of telephone calls and associated information, and improved service with regard to client satisfaction. Such computer-enhanced telephony is known in the art as computer-telephony integration (CTI).

There are many ways that CTI enhancement may be done in the art, and the present inventors are knowledgeable in most of these. The present inventors are also knowledgeable about many special architectures and software enhancements that are not in the public domain. In the following background material only that material specifically designated as prior art should be taken to be acknowledged as prior art material by the inventors.

Generally speaking, CTI implementations of various design and purpose are implemented both within individual call-centers and, in some cases, at the telephone network level. For example, processors running CTI software applications may be linked to telephone switches, service control points (SCPs), and network entry points within a public or private telephone network. At the call-center level, CTI processors are typically connected to telephone switches and, in some cases, to similar CTI hardware at the network level, often by a dedicated digital link. CTI processors and other hardware within a call-center are commonly referred to as customer premises equipment (CPE). It is the CTI processor and application software in such centers that provides computer software enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents using such stations may have access to stored data and enhanced services and tools as well as being linked to incoming callers by telephone equipment. Such stations may be, and usually are, interconnected through the PC/VDUs by a local area network (LAN). One or more data or transaction servers may also be connected to the LAN that interconnects agent stations. The LAN is, in turn, typically connected to the CTI processor, which is connected to the call switching apparatus of the call center in systems known to the present inventors.

When a call arrives at a call center, whether or not the call has been pre-processed at a service control point (SCP), typically at least the telephone number of the calling line is made available to the receiving switch at the call center by the network provider. This service is available by most networks as caller-ID information in one of several formats such as Automatic Number Identification (ANI). Typically the number called is also available through a service such as Dialed Number Identification Service (DNIS). If the call center is computer-enhanced (CTI), the phone number of the calling party may be used, in systems known to the present inventors, as a key to access additional information from a customer information system (CIS) database at a server on the network that connects the agent workstations. In this manner information pertinent to a call may be provided to an agent, often as a screen pop on the agent's PC/VDU.

In recent years, advances in computer technology, telephony equipment, and infrastructure have provided many opportunities for improving telephone service in public-switched and private telephone intelligent networks. Similarly, development of a separate information and data network known as the Internet, together with advances in computer hardware and software have led to a new multi-media telephone system known in the art by several names. In this new system telephone calls are simulated by multi-media computer equipment, and data, such as audio data, is transmitted over data networks as data packets. In this system the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional systems are referred to herein as Connection-Oriented Switched-Telephony (COST) systems, CTI enhanced or not.

The computer-simulated, or DNT systems are familiar to those who use and understand computers and data-network systems. Perhaps the best example of DNT is telephone service provided over the Internet, which will be referred to herein as Internet Protocol Network Telephony (IPNT), by far the most extensive, but still a subset of DNT.

Both systems use signals transmitted over network links. In fact, connection to data networks for DNT such as IPNT is typically accomplished over local telephone lines, used to reach points in the network such as an Internet Service Provider (ISP), which then connects the user to the Internet backbone. The definitive difference is that COST telephony may be considered to be connection-oriented telephony. In the COST system, calls are placed and connected by a specific dedicated path, and the connection path is maintained over the time of the call. Bandwidth is basically assured. Other calls and data do not share a connected channel path in a COST system. A DNT system, on the other hand, is not dedicated or connection-oriented. That is, data, including audio data, is prepared, sent, and received as data packets over a data-network. The data packets share network links and available bandwidth, and may travel by varied and variable paths.

Recent improvements to available technologies associated with the transmission and reception of data packets during real-time DNT communication have enabled companies to successfully add DNT, principally IPNT, capabilities to existing CTI call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities.

In addition to Internet Protocol Network Telephony (IPNT) calls, a DNT center may also share other forms of media with customers accessing the system through their computers. E-mails, Video mails, fax, file share, file transfer, video calls, and so forth are some of the other forms of media, which may be used. This capability of handling varied media leads to the term multimedia communications center. A multimedia communications center may be a combination CTI and DNT center, or may be a DNT center capable of receiving COST calls and converting them to a digital DNT format. The term communication center will replace the term call center hereinafter in this specification when referring to multimedia capabilities.

In typical communication centers, DNT is accomplished by Internet connection and IPNT calls. For this reason, IPNT and the Internet will be used in examples to follow. It should be understood, however, that this usage is exemplary, and not limiting.

In systems known to the inventors, incoming IPNT calls are processed and routed within an IPNT-capable communication center in much the same way as COST calls are routed in a CTI-enhanced call center, using similar or identical routing rules, waiting queues, and so on, aside from the fact that there are two separate networks involved. Communication centers having both CTI and IPNT capability utilize LAN-connected agent-stations with each station having a telephony-switch-connected headset or phone, and a PC connected, in most cases via LAN, to the network carrying the IPNT calls, or to a network-connected server on the LAN. Therefore, in most cases, IPNT calls are routed to the agent's PC while conventional telephony calls are routed to the agent's conventional telephone or headset. Typically separate lines and equipment are implemented for each type of call weather COST or IPNT.

Due in part to added costs associated with additional equipment, lines, and data ports that are needed to add IPNT capability to a CTI-enhanced call-center, developers are currently experimenting with various forms of integration between the older COST system and the newer IPNT system. For example, by enhancing data servers, interactive voice response units (IVR's), agent-connecting networks, and so on, with the capability of conforming to Internet protocol, call data arriving from either network may be integrated requiring less equipment and lines to facilitate processing, storage, and transfer of data. Some such equipment and services are known to the present inventors, which are not in the public domain.

With many new communication products supporting various media types available to businesses and customers, a communication center must add significant application software to accommodate the diversity. For example, e-mail programs typically have differing parameters than do IP applications. IP applications are different regarding protocol than COST calls, and so on. Separate routing systems and/or software components are needed for routing e-mails, IP calls, COST calls, file sharing, etc. Agents must then be trained in the use of a variety of applications supporting the different types of media.

Keeping contact histories, reporting statistics, creating routing rules and the like becomes more complex as newer types of media are added to communication center capability. Additional hardware implementations such as servers, processors, etc. are generally required to aid full multimedia communication and reporting. Therefore, it is desirable that interactions of all multimedia sorts be analyzed, recorded, and routed according to enterprise (business) rules in a manner that provides seamless integration between media types and application types, thereby allowing agents to respond intelligently and efficiently to customer queries and problems.

In a system known to the inventor, full multimedia functionality is supported wherein agents and customers may interact in a seamless manner. Likewise interaction histories of virtually any supported media may be automatically recorded and stored for latter access by agents and in some cases customers (clients) themselves. Such a system, termed a customer-interaction-network-operating system (CINOS) by the inventor, comprises a suite of software enhancements, implemented both at the communication center and at CPE sites that are designed to provide automated and seamless interaction between customers, associates, and agents.

In order to successfully implement and administer the many aspects of a network operating system such as the CINOS system introduced above, a new agent called a knowledge worker has emerged. This is especially true in more state-of-the-art multimedia communication-centers. In a broad sense, a knowledge worker may be any individual that specializes, or is expert in a specific field or fields utilized within the communication center. Knowledge workers may be responsible for such tasks as creating automated scripts, building integrated software applications, tracking and parsing certain history paths in a database for automated reporting, and other relatively complicated functions. Knowledge workers may also be trained agents responsible for sales, service and technical assistance.

A knowledge worker, weather an agent or specialized technician, generally has all of the resource in the way of customer data, interaction data, product data, and multimedia support at his fingertips as long as he or she is operating from a designated PC/VDU or other supported station within the communication center. In some cases, a knowledge worker may have full data access and multimedia support if he is located off-site but is linked to the center by a suitable data-network connection such as from a home office or remote station.

Because a network operating system such as CINOS requires that certain customer or client CPE, including network equipment, be enhanced with software designed to facilitate seamless interaction with the communication center, it is often necessary that knowledge workers be dispatched into the field away from the communication center to aid in such as installation, set-up, and programming of software applications and tools. In some instances this can be a formidable enterprise.

A knowledge worker possesses the kind of skills that are largely indispensable and not shared by the average communication center worker. When a knowledge worker is away from a home-center such as on the road, or at a client location, he is generally limited in data access and interaction is capability with his or her home communication-center data and tools. In some cases this may be a liability to the center. In many cases she/he will be limited to specific data that was carried along, or that may be downloaded from the center to such as a cellular telephone, a personal digital assistant (PDA) or a Laptop computer. Moreover, a mobile knowledge worker in the field may also be limited in providing service to the home-center by virtue of the same data-access limitations.

In some cases, a knowledge worker at a client site may, after some set-up, programming, and initialization, commandeer a suitable client PC so that she/he may establish free and unfettered access to home-center data and software services. However, such interaction, if not on the be-half of the client, may be deemed by the client as an intrusion at most and an inconvenience at least.

In typical contact centers, which may also include multimedia communication centers, the preponderance of incoming and outgoing interactions are processed by voice (DNT) or Web-based self service interfaces or by communication-center agents located within the domain of the center and managed through a communication center environment. However, many interactions cannot be successfully processed through client self-service interfaces or on-site agents often because of a high level of assistance required. Such interactions require the expertise of a knowledge worker, a knowledge worker being a call-center employee with a more detailed knowledge of the center structure and operations than the typical on-site agent.

Knowledge workers are not required for routine service assistance or other duties that are routinely performed within the domain of the center. As a result, they are typically located off site in a pool or remote to the extent of performing as a home-based or traveling workers. Therefore, standard communication center control systems and procedures cannot be applied to such knowledge workers. Often this problem is due to an absence of a CTI link established between the location of the knowledge worker and the communication center. Off-site knowledge workers are mobile and typically operate using a variety of communication equipment (non-CTI telephone, personal digital assistants [PDAs], wireless Web, etc.) and using applications that are not assimilated in standard or unified array throughout the communication environment. Therefore, it becomes increasingly difficult to provide management from the communication center in terms of state control and report accessibility. For example, which of a force of off-site knowledge workers are at any given time able to receive an interaction wherein they are also able to exchange interaction-related data with the center, client or both?

Remote knowledge workers are, from a control and management standpoint, invisible to standard CTI-enabled facilities. Not having the ability to manage these workers causes the ongoing costs associated with doing business from a communication center to rise.

The inventors are familiar with a system taught in U.S. Pat. No. 5,802,163 entitled Methods and Apparatus for Implementing an Outbound Network Call Center referenced in the Cross-Reference to Related Documents section of this specification. That system teaches a method and apparatus for integrating a remote home agent in a call center. In practice, the home agent or knowledge worker must dial a specific enabled telephony switch in the telephone network when an interaction to the agent is detected. This action terminates the incoming interaction to a first station-side port of the telephony switch. A connection is thus maintained between the home agent and the telephony switch until the agent disconnects. In this way, all events that are determined to be destined to the home agent are switched to the established connection. This action provides a continuing connection between the telephony switch and the home agent until the home agent disconnects. Events, such as incoming calls at the center selected to go to the home agent may then be switched to the established connection. The telephony switch functions as a login portal for the agent; however only the agent's media stream is controlled in this case. Interaction-related data and agent status are not considered or addressed.

The inventors are also familiar with a call-center system taught in U.S. Pat. No. 5,960,073 entitled Method and Apparatus for Providing an Interactive Home Agent with Access to Call Center Functionality and Resources also listed in the Cross-Reference section of this specification above. This system supports remote agent stations through a network by establishing a data link between a computer platform at the remote agent station and a CTI-processor connected to a telephony switch at the call center. Events destined to the agent are switched from the call center to a telephone at the agent station while data pertaining to the calls is transferred over the data link to the computer platform at the remote agent station to be displayed. In this system data pertaining to or related to calls is retrieved from a database at the call center. The data can include scripts for an agent at the remote station.

Call center services are supported by cooperation between software at the CTI processor and the computer platform at the remote station. In one embodiment the data link, once established, is kept open while calls continue to be switched to the remote station. In another embodiment after an initial agent log in, dial up is done from the remote station upon detecting calls from the call center by a TAPI compliant device. A reduced log is performed at the CTI processor at the call center to save time. In yet another embodiment, the CTI processor establishes the data connection each time using a modem bank adapted for dialing. The modem bank switches the call from the call center to the remote station. A plurality of remote stations may be thus supported.

The inventor is familiar with yet another system taught in U.S. patent application number 2001/0023448 entitled Method and Apparatus for Data-Linking a Mobile Knowledge Worker to Home Communication-Center Infrastructure also listed in the cross-reference section of this specification. The system is a proxy system enabling a worker remote from a communication center to operate with full access to data and software at the communication center from a light computer device typically unable to operate as a workstation at the communication center. In this system, a proxy server, which may be a LAN-connected server at the communication center, has a two-way data link to the light computer device operated by the remote agent. The proxy executes software, which ascertains the hardware and software characteristics of the light device.

The proxy server accesses communication-center data at direction of the light device, operates communication center software tools, and provides results to the light device over the communication link in a form usable by the light device. This approach suggests a general method for management of remote knowledge workers from within a contact center (CC). In particular, it suggests using a proxy server as a mediator between a contact center environment and a remote agent device. However, it is still limited in terms of further enhancement that might enable more specific techniques and mechanisms.

The inventor is aware of yet another system for managing remote agents of a communication center that includes a primary server connected to the network, the primary server controlling at least one routing point; one or more secondary servers distributed on the network and accessible to the remote agents, the secondary server or servers having data access to agent computing platforms and communication peripherals; and, a software suite distributed in part to the secondary server or servers and distributed in part to one or more agents computing platforms and peripherals, the software suite including protocol for reporting agent status data. This system monitors agents computer platforms and peripherals for activity state through the one or more secondary servers whereupon the one or more secondary servers exchange control messaging and event related data using ISCC protocols with the primary server over the network for intelligent routing purposes.

It has occurred to the inventors that during an interaction between an agent and a customer, it is often desirable to enhance a live transactional process or customer care interaction using accurate information about the accessing customer from a well-established customer care or management system. However, in current art integration attempts between two such different systems have been limited to only a few media channels. Further, these systems often include independently operating components that may cause repeated introductions during customer relation management, or interactive help menus that are not synchronized.

Another challenge of current integrated systems is that often a business customer operates with different areas of a same enterprise, or group of enterprises that may share one or more contact centers. Therefore, CRM data and CC data may include irrelevant information from parts of the enterprise and customer profile that are not related to a particular piece of business being conducted.

What is clearly needed in the art is a method and apparatus for seamlessly integrating a customer relations management system and one or more communication center functionalities relative to a live or pending connection between a customer and a communication center or some current transactional flow or messaging flow in a fashion that enables agent view and status control from a convenient interface such as a desktop. Such a system would enhance customer satisfaction, transactional efficiency, and enterprise profitability.

SUMMARY OF THE INVENTION

A system for integrating a contact center, an agent station, and a customer relation management server for communication includes a network adapter node having port connection to the contact center, the agent station, and the customer relation management server; and one or more dynamic states running on the network adapter mode wherein the one or more states described represent current agent activity and presence attributes according to model. In a preferred embodiment, the communications networks serviced includes the Internet network and a telephone network.

In one embodiment, the adaptor has an additional data connection to a data library for aid in CTI data interpretation. The one or more dynamic states represent an agent status model identifying the agent, the channels of the agent, and the current presence and activity conditions of the agent in interaction relative to the channels.

In one embodiment, the customer relation management system is physically located within the contact center. In another embodiment, the customer relation management system is a third-party-maintained system. In a preferred embodiment, the at least one or more dynamic states are updateable from an agent station and from a contact center.

In one embodiment, the agent state updates are pushed to the connected nodes according to need dependent upon current media events received at the agent station and queued for the agent station. In another embodiment, the agent state updates are accessed from the at least one dynamic state through a subscription to services and an agent model reporting the state or states.

In one embodiment, the system further includes a software instance running on the agent station, the instance providing agent interaction and agent control ability for manipulating agent states including an interface for interacting with customer relation services. In this embodiment, the software instance is a browser plug-in or otherwise browser based with data transferred over hypertext transfer protocol enabled network connections.

In one embodiment, the system further includes a software instance running at the contact center the software adapted to provide event notification, queue management, agent state interpretation, and agent state updates. In this embodiment, the software instance contains a descriptor of voice destination parameters and a descriptor of media channel destination parameters for each agent status model that describes a single or a group of agents.

In one embodiment, the customer relation management server accesses the agent station based on agent state detection and current need according to enterprise rules. In this embodiment, the customer relation management server provides services appropriate to the state or states detected. In another embodiment, the agent station based on agent state detection and current need according to enterprise rules accesses the customer relation management server and orders data and or services.

According to another aspect of the present invention, a method is provided for automated ordering and receipt of data and or services provided by a customer relation management system to a communications terminal according to reported state information about live or asynchronous media events routed to the terminal comprising steps of (a) routing an event or notification thereof to the communications terminal; (b) reporting the state information related to the routed event or notification thereof to the customer relation management system during the time of routing of the event for connection; (c) determining at the customer relation management system the specific data and or services needed; and (c) receiving at the terminal the data and or services or a notification of availability thereof from the customer relation management system during or before the time of event interaction at the terminal.

In one aspect, the state information is part of an agent status model and the ordering of data or services is performed at a network adapter containing the agent status model. In one aspect, in step (a) the event is one of a telephone event or a voice over IP event. In another aspect, in step (a) the event is one of an email event, a chat request event, or an instant messaging event. In still another aspect, in step (a) the event is a hypertext transfer protocol request.

In one embodiment, in step (a) the communications terminal is an agent station comprising a computer connected to a network and a telephone. In one aspect, in step (b) reporting is performed in a network adapter node consulting an agent status model for state information related to the routed event. In this aspect, in step (b) the state information includes at least the event media type, event author ID, routing source ID, routing destination ID, contact destination ID, and queue ID and position therein.

In one embodiment, in step (b) the state further includes a pre-determined ID relevant to specific data and or services to be delivered. Also in one embodiment, in step (c) the determination is made according to specific ID. In another embodiment, in step (c) the determination is made according to a best option matching the state information of more than one option available to the customer relation management server.

In still another embodiment, in step (b) the state information related to the routed event results from a manual change of settings from the point of the communications terminal. In an aspect of this embodiment, the change results in customer relation management system delivery of a solution covering more than one event described in the agent status model.

DESCRIPTION OF THE PREFERRED EMBODIMENTS

Figure 1:
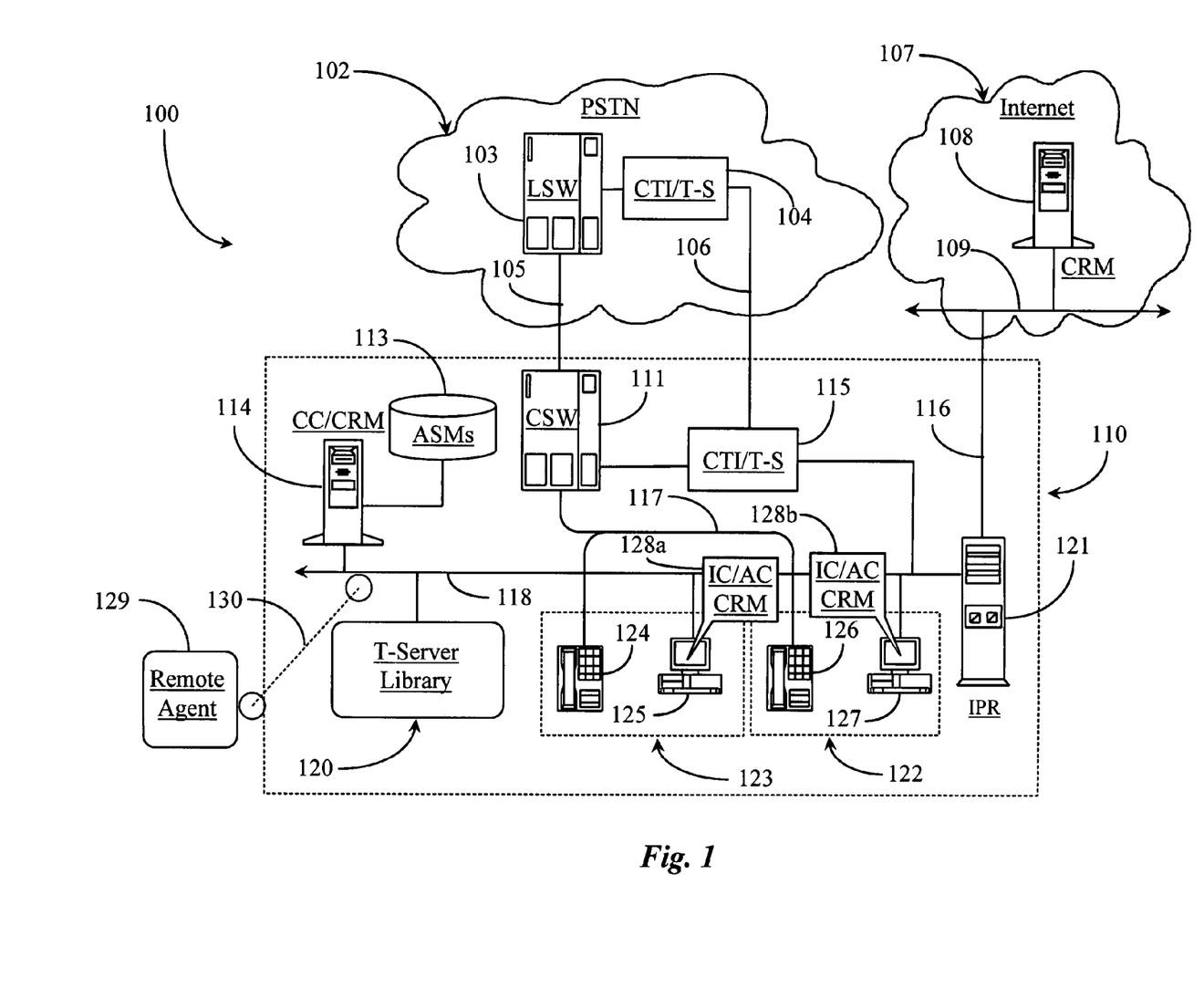
FIG. 1 is an architectural overview of a communications environment enhanced for practice of the present invention.

FIG. 1 is an architectural overview of a communications environment 100 enhanced for practice of the present invention. Communications environment 100 includes a public-switched-telephone-network (PSTN) 102, an Internet network 107, and a communications or contact center 110.

PSTN network 102 may be another type or configuration of telephone network without departing from the spirit and scope of the present invention. For example, network 102 may be a wireless network or a combination of wireless and wired networks. Likewise, network 102 may be a private or public telephone network. PSTN 102 contains a local telephone switch (LSW) 103 for receiving and routing telephone calls in the network. Switch 103 may be an automated call distributor (ACD), a private branch exchange (PBX) or some other call switching hardware, which may also function as a service control point (SCP).

In this example, LSW 103 has connection to communication center 110 by way of a telephony trunk 105. Also in this example, LSW 103 is enhanced with a computer-telephony-integration (CTI) processor 104 running an instance of transaction server (T-S) known to the inventor. Processor 104 provides intelligent telephony and interaction capabilities to an otherwise relatively "dumb" LSW 103. Examples include intelligent peripherals live interactive voice response systems, and other like capabilities. The instance of T-S running on processor 104 provides an array of intelligent routing services, which may be integrated with CTI and intelligent peripheral functions.

Communication center 110 has a central office switch (CSW) 111 provided therein and adapted to receive incoming telephone calls from PSTN 102 for the purpose of internal routing to communication center personnel and automated help or service systems as is known in the art. CSW 111 is, of course, also adapted for outbound calling. CSW 111 may be a PBX or other type of telephone switch as mentioned above with reference to LSW 103. CSW 111 is connected to LSW by telephone trunk 105. CSW 111, like LSW 103 is also connected to a CTI processor 115 running an instance of T-S server.

Processor 115 uses a separate data network 106 for communicating with processor 104. In this way, intelligent routing routines may be created and implemented at the PSTN level thereby enabling performance of internal call routing at the network level. Data solicited from a caller may be transferred into center 110 ahead of the actual telephone call with the use of network 106 and the connected CTI processors and T-S instances. Agent level routing may then be performed at network level and may be controlled by center 110.

Center 110 has a local-area-network (LAN) 118 provided therein and utilized to connect multiple workstations and systems together for communication. In this example, an agent workstation 122 and an agent workstation 123 are illustrated having LAN connectivity. Workstation 122 contains typical agent equipment for communication not limiting to a personal LAN-connected computer 127 with a video display unit (VDU) such as a computer monitor and an agent telephone 126. Telephone 126 has connectivity to CSW 111 via internal telephone wiring 117. Workstation 123 is adapted for communication in a like, but not necessarily identical, manner as is station 122 by way of a LAN connected computer 125 and by way of an agent telephone 124.

It is noted herein that additional communication equipment types may be represented within stations 123 and 122 without departing from the spirit and scope of the present invention. For example, fax machines, automated answer systems, financial processing terminals, and other such network-capable equipment types. The inventor chooses to represent only a computer station and telephone as two of the most common types of agent equipment used for communication. In one embodiment of the present invention, telephones 124 and 126 may be data phones connected to respective computer hosts as terminal machines. There are many configuration possibilities as well as equipment variances possible.

CTI processor 115 has a LAN connection to enable agents with administrative authority to modify or create new routing routines and so on. The function of T-S within processors 115 and 104 depends on accessibility to a transaction server library (T-Server Library) 120, which in this example, is connected to LAN 118. Library 120 contains all of the objects, descriptors, and constructs to enable integrated CTI/Transaction Intelligent call processing.

Internet network 107 is part of communications environment 100. Internet 107 may be another type of wide-area-network (WAN) instead of the well-known Internet without departing from the spirit and scope of the present invention. For example, network 107 may be a corporate or private WAN or metro-area-network (MAN). The inventor chooses the Internet network as a preferred example because of the standardized protocols and high public-accessibility characteristics.

Internet network 107 has a network backbone 109 extending there through that represents all of the equipment, lines and access points that make up an Internet network as a whole, including any connected sub-networks. Therefore, there are no geographic limitations to the practice of the present invention. A customer relations management (CRM) server 108 is provided or otherwise illustrated within Internet network 107 and is adapted to manage customer relations relative to one or more customer bases related to one or more enterprises such as one hosting communication center 110 for example.

CRM system 108 may be provided by a third party enterprise such as, for example, Microsoft™ Corporation without departing from the spirit and scope of the present invention. A third-party CRM solution may be implemented from the base of a third-party enterprise that may include third party customer management services without departing from the spirit and scope of the present invention. Likewise, CRM server 108 may be part of a customer premise equipment (CPE) solution whereby the entire customer base is related to the host enterprise and serviced internally at a specific communication center such as center 110. In the latter case, CRM server 108 may be hosted within the physical domain of center 110 and connected to LAN 118.

In still another embodiment, CRM system 108 may be adapted to service a customer base related to a plurality of regionally distributed contact or communication centers of a same enterprise. In this case, a separate but centralized facility may be provided within the domain of Internet 107 whereby those customers of multiple centers may be managed according to the policies and rules established at each center.

In this example, center 110 is a multi-media-capable communication center with Internet connectivity for contact and interaction with customers and business entities. An Internet protocol router (IPR) 121 is provided within center 110 and has connection to LAN 118. IPR 121 is adapted to receive multimedia and communication events from Internet 107 and to route such events to agent stations like stations 122 or 123 over LAN 118. Multimedia events may include email events, Web form interactions, voice over IP interactions, Web messaging interactions, multimedia-capable, or text chat sessions, video mail interactions, network conferencing sessions, and IP telephony sessions. Therefore, organized channels (media channels) and routing systems may be in place for handling these types of network interactions or events. Likewise, one or more Internet servers (not illustrated) may be provided to host certain network interaction like chat or Web-meetings. Such server may be assumed present in this example and provided within the domain of Internet 107, which includes that of LAN 118 when connected online.

CRM system 108 may be adapted to provide automated self-help services, Web-form services, email services, automated fax services, and other multimedia services. Likewise, back-end data from a CRM system may include history information; statistical information; further contact information; and links to other resources.

A CC/CRM adaptor system 114 is provided within communication center 110 and is adapted to integrate CRM capabilities with agent and call-control/management capabilities at the level of an agent workstation or desktop. CC/CRM system adaptor 114 is adapted to provide integration between CRM system 108 and CTI-T-S capability (processor 115) using dynamic agent state models (ASMs) 113. ASMs 113 represent a collection of agent models representing individual agents and agent capabilities and work task assignments of those agents assigned to the domain of system 114, or in this case, agents that are available through contacting communication center 110.

Within system 114, contact-center function and management is abstracted as well as CRM service function and management so that they may be simultaneously managed and monitored in a convenient agent user interface with graphic display capability at the agent level. CRM adaptor system 114 has a parent application (not illustrated) that communicates with client applications distributed to agent stations. An instance of interaction control/agent control (IC/AC) and CRM client interface 128a is provided within the domain of agent workstation 123 and is executable as a software instance from the desktop of computer 123. A similar instance of IC/AC/CRM 128b is provided within the domain of station 122 and is executable as a software instance from computer 127.

Executing and running instance IC/AC/CRM instance 128a enables an agent, for example, operating at station 123 to receive voice and media events and at the same time provide CRM services to callers or interaction participants in a way that follows the ASM of that particular agent. The agent ASM for station 123 defines the agent, and all of the communication capabilities of the agent including all of the CRM services available to customers of the agent and to the agent related to those customers. In addition, the ASM for an agent includes dynamic call and session management including current agent state and presence over a plurality of media channels including live voice channels. Client instance 128a effectively bridges CRM and CTI-related services particular to agent model, customer definition, and event purpose using both manual and, in some cases automation to select or provide services and data needed to enhance the transactional experience for both the agent and caller.

In practice of the present invention, an agent operating, for example, at station 123 may receive telephone voice call events from PSTN 102 by way of routing through CSW 111 and internal telephone wiring 117. The presence of these calls in the system is noted and recorded at CTI/T-S processor 115, which has connection to CC/CRM adaptor 114 over the LAN. In one embodiment a direct data link (bridge) may be provided between CTI/T-S processor 115 and adaptor 114. CC/CRM adaptor 114 prompts CRM system 108 when a communication event relevant to agent station 123 is being routed.

During routing, the telephone call is routed to agent telephone 124 while data about the call is routed over LAN 118 to computer 125 and is displayed, often ahead of pickup of the telephone call. The earlier prompt or request made to CRM 108 by CTI/T-S processor 115 may be an initial machine-to-machine request using hypertext transfer protocol/simple object access protocol (HTTP/SOAP) asking CRM 108 to be ready to send data about the caller to agent desktop 125 using HTTP protocols, in this case via a network-access path defined by access line 116 and LAN 118 and IPR 121, which routes the connection. CRM 108 may be in a state of monitor, or always connected to the main system wherein connections to agent desktops are automatic.

In one embodiment, CRM 108 stands ready and waits for a request from the agent operating station 123. In this scenario, data about the call and caller may arrive at computer 125 before the call is picked up at telephone 124. The agent may then use IC/AC/CRM instance to send a request for specific services and/or data to be available at the desktop when the agent picks up the call. CTI telephony call transfer services and multiparty connecting may be leveraged, for example, as examples of CRM service solutions provided by CRM server 108. CRM server 108 may be prompted to deliver a solution implemented at CSW 111, like a multiparty-bridged connection or meeting wherein the agent initiates the connection and then drops out to take a next call.

In one embodiment, data network telephony (DNT) callers may contact center 110 using soft phones (IP-Based) or Internet-capable cellular telephones. In these scenarios, there may be more media channels available to the interaction like messaging, chat, email, and so on. In a pure DNT sense, IPR 1212 may notify CC/CRM adaptor of an event for station 123 such as a videoconference using a host server (not illustrated). CRM may set up the initial space and format for the conference for the agent and the agent may add specific contacts provided by CRM server 108, which may be visible in an interactive list on the agent's desktop interface. An agent may interact, and may bring in new media channels and capability to the instant interactions dynamically.

ASMs 113 are constantly updated during activity periods and are rendered in a state of inactive or non-accessibility when the associated agent is not available for communication. When an agent comes online, his ASM is activated and he is then ready for interaction. CC/CRM adaptor 114 and the agent instance of IC/AC/CRM 128*a*, for example, are both charged with reporting state data to appropriate destinations.

Agent stations 123 and 122 are not required to be located within a contact center in order to practice the present invention. A remote agent may practice the present invention using his own telephone line and an Internet or prevailing WAN or MAN connection as long as his or her telephone calls are routed from CSW 111. A roaming agent 129 is illustrated in this example with a wireless connection to LAN 118. Agent 129 may also practice the invention using his or her wireless access connection to LAN 118 and a cellular telephone. Again all telephone calls need to be routed through CSW 111 or a similar CTI enhanced switch.

One with skill in the art of network communication architecture and equipment will recognize that adaptor 114 may be a soft adaptor running in CTI/T-S processor 115, or in IPR 121, or in some other connected host without departing from the spirit and scope of the present invention. Moreover, CRM system 108 may be provided as a third-party service or a CPE implement without departing from the spirit and scope of the present invention.

Figure 2:
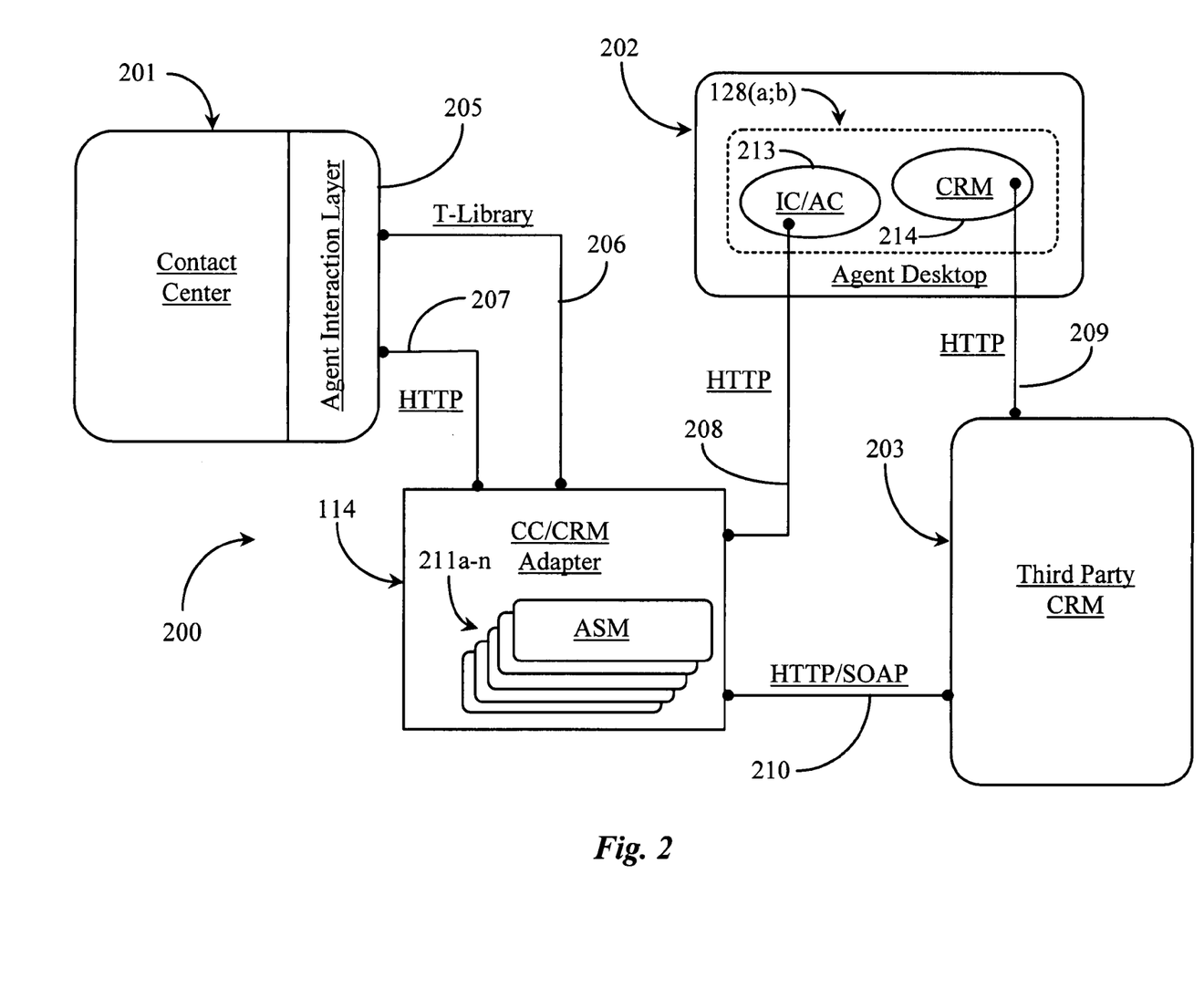
FIG. 2 is a block diagram illustrating network connectivity using the CC/CRM adaptor of FIG. 1.

FIG. 2 is a block diagram 200 illustrating network connectivity using CC/CRM adaptor 114 of FIG. 1. Diagram 200 includes a contact center 201, which may be analogous to communication center 110 described above with reference to FIG. 1. Diagram 200 also includes CC/CRM adapter 114, an agent desktop 202, and a third-party CRM system 203.

In a preferred embodiment of the present invention, center 201 has an agent interaction layer 205 provided therein and adapted to provide abstraction of communication center data and CTI data about any particular agent practicing the present invention. In a preferred embodiment, the abstracted data is used to provide and to update agent status that is represented within CC/CRM adapter 114 in the form of an object model termed an agent status model (ASM), a plurality of which are illustrated therein and assigned to element number 211*a–n*. An ASM contains at least agent identification, workflow assignments, media capability descriptions, and status elements related to communication and media elements. The status elements of an ASM model are dynamic and updated in real time as an agent proceeds to take calls and communicate using multimedia applications from his or her workstation.

ASMs 211 *a–n* becomes active when an agent logs into the system and begins processing work. Likewise, when an agent logs off of the system and is no longer available, his or ASM is de-activated meaning that no presence of the agent is detected. ASMs 211 *a–n* may use any existing presence protocols including CTI-enabled protocols for indication current presence and agent state to both systems and ultimately to callers waiting to connect to an agent.

Contact center 201 is the vehicle delivering calls and other interaction events to the agent operating at agent desktop 202. Agent state information is available from CC 201 and from agent desktop 202 with agent control enabled. Contact center 201 has an HTTP data connection 207 to CC/CRM adapter 114 for delivering and receiving agent state and task reports or assignments. Contact center 206 also has a CTI-enhanced connection 206 to CC/CRM adapter 206 for exchanging T-server information including access to a t-server library analogous to library 120 described above with reference to FIG. 1.

CC/CRM adapter 114 has an HTTP/SOAP connection 210 to CRM system 203, which in this case is a third-party service. In this way, CRM system 203 has access to all of the agent's activity states and presence states according to ASM reportable states. Connection 206 may additionally provide caller information, event information, routing information, platform identification, and so on to applicable ASMs whereby certain portions of that data may be pushed to CRM system 203 accordingly in service requests over connection 210.

CC/CRM 203 has an HTTP connection 209 to agent desktop 202 for the purpose of enabling CRM interface 214 within an IC/AC/CRM agent application 128(*a;b*) described with reference to FIG. 1 above. CRM 214 is the CRM interface portion of the application, which may be accessible to an agent using browser-based technology including all applicable and possible extensions such as java bean. Active X and many other plug-in type extensions which may vary according to agent capabilities. CRM system 203 may be caused to deliver data and customer relations management solutions to an agent over HTTP 209 to the agent CRM interface 214. Likewise, an agent may also make requests for service to CRM system 203 using HTTP connection 209 through any operating browser.

Connection 210 in this example enables much automation with respect to CRM/desktop interfacing. That is to say that pre-configured services maintained by CRM 203 may be automatically triggered and delivered to desktop 202 over connection 209 based on ASM state reporting and enterprise rules that are in place. This saves much time and work for an agent busy interacting with clients over more than one media.

Agent desktop 202 has connection with CC/CRM adapter 114 via an HTTP link 208, which is also browser-based in a preferred embodiment. Therefore agent current state information relevant to desktop activities and communication states are reported back to adapter 114 for update to and appropriate ASM. CRM system 203 may access this information and use it during service delivery, connection management, session management, and the like. By the same token, contact center 201 may access and utilize the information for updating queue times, changing queue availability and status, appending to communication center logs and statistical data, and for making adjustments to ongoing workflow and task management functions.

The provision of CC/CRM adapter 114 essentially bridges a network between the contact center function, the agent station and function and the CRM system and function and enhances intelligence and efficiency for all systems by sharing pertinent real-time information as work processing proceeds for each logged in agent. In a preferred embodiment, the system of the present invention is browser-based;

therefore there or no geographic limitations or configuration limitations for agents practicing the present invention. All that is required to practice the present invention is a client application analogous to IC/AC/CRM 128(a;b) and that events are routed through a host contact center analogous to communication center 110.

Figure 3:
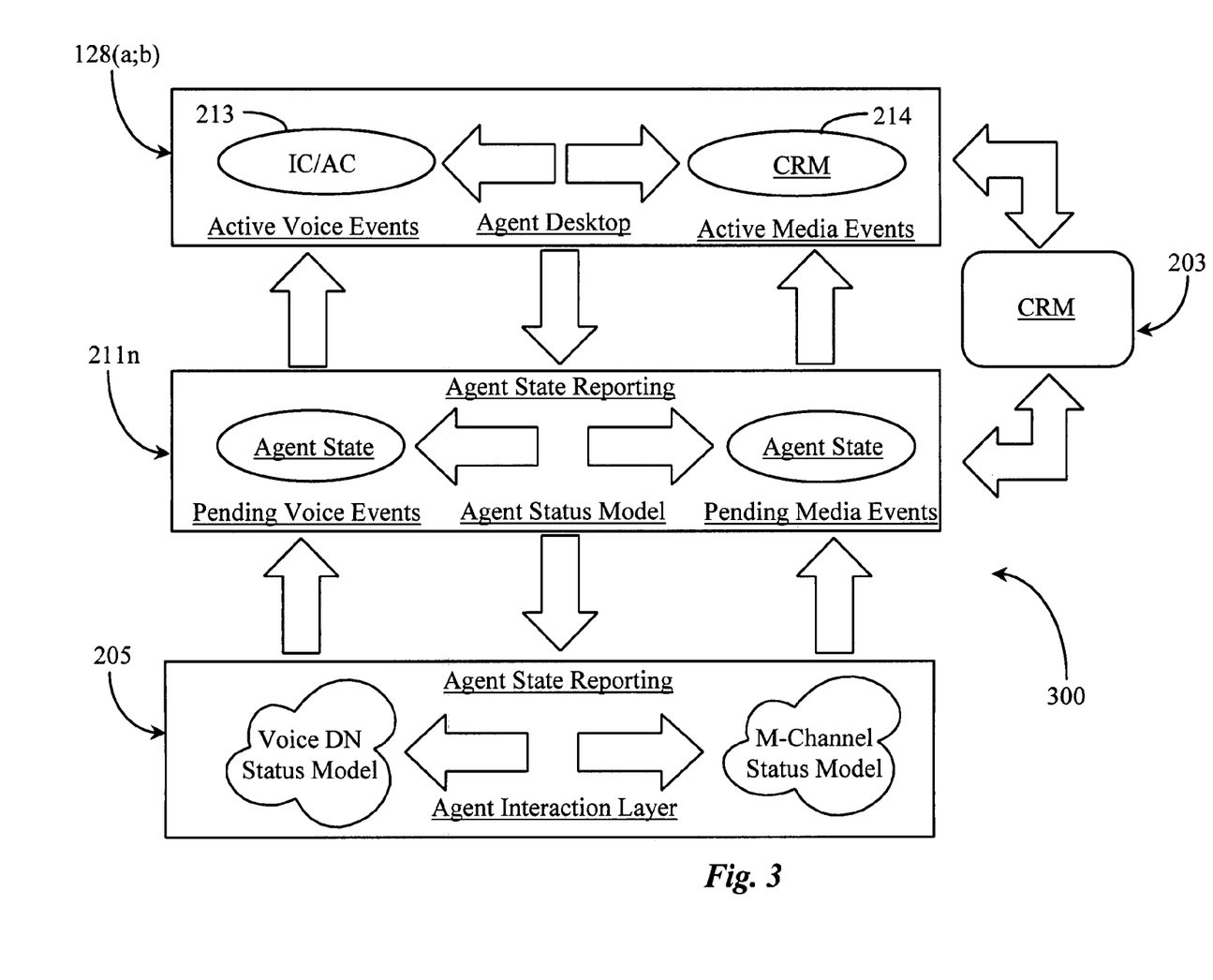
FIG. 3 is a block diagram illustrating agent status model integration according to an embodiment of the present invention.

FIG. 3 is a block diagram 300 illustrating agent status model integration according to an embodiment of the present invention. Agent interaction layer 205 contains a voice destination number status model and a media channel status model, which contain the static or semi-static configurations for each active agent assigned to the system of the invention. This information is also made part of each ASM for which the information is applicable to. For example, an agent telephone number, e-mail address, instant message address, video conferencing id address, and so on would be static contact information that is subject to state reporting through ASM reporting. Likewise agent queue numbers and types may be configured statically or dynamically if an agent moves from queue to queue. Moreover, a group of agents may share a single multimedia queue or a virtual queue.

As the contact center routes events to an agent, interaction layer 205 manages delivery and notification of those events taking into consideration the current state of an agent ASM model. Therefore, ASM 211n, for example, contains the queued and active state information for an agent's telephone interactions and IP voice events. Likewise, ASM 211n maintains state of availability of the agent and status of activity regarding other pending synchronous and asynchronous media events. At the other end, agent application 128(a;b) uses IC/AC portion 213 and CRM portion 214 to interface and set controls and states. For example, an agent may decide to temporarily put aside email processing if he or she becomes swamped with telephone calls. In such a case IC/AC controls on the desktop can be manipulated to "turn off" email processing until a later time. The agent desktop reports this update immediately to the agent status model 211n, which reports it to agent interaction layer 205 and possibly to CRM system 203. Reporting may be based on a push model, or on a publish-and-subscribe model.

Back at the contact center, interactive voice options, queue messages, and other contact-point controls may be updates dynamically to reflect the new agent status of "temporarily not answering email". CRM system 203 may be configured in this case to replace the live agent email function with an automated self-help function temporarily for the duration of the downtime. ASM state reporting may automatically trigger the function.

One with skill in the art will recognize that agent presence and state with respect to voice calls may be extended to the level of the accessing PSTN or other telephone network once interaction layer 205 is aware of the ASM state using CTI/T-S network communication. For example, an agent may have more than one extension tied to a telephone contact number whereby the agent decides to disable one of those extensions during a peak period. ASM reporting immediately updates the state information to interaction layer 205, which may then publish the information to all access points and systems that use the number.

In still another embodiment, CRM function and state of activity may be published to an ASM model for one or more agents. In this way CRM solutions may be monitored and graded statistically. CRM system 203 may, in one embodiment, deliver solutions virtually to a contact point other than an agent's desktop. For example, if an agent or a pre-configured ASM update causes a request to CRM for intervention, that intervention may be ordered by CRM notification to a distributed service point accessible to the caller. In this way certain CTI functions may also be triggered to support the new interface point like voice call transfer, or web server redirect. There are many possibilities. Likewise, through agent control (AC) on the desktop, call transfers, conferencing, and other CTI functions may be implemented from the desktop by the agent, at which time, ASM 211n, for example, would be updated.

In one embodiment, an agent may have more than one ASM model to one interaction layer and contact center. In this case, the agent may have responsibility for separate parts of the business. The ASM models would be specific to each business part in terms of the contact center view of the task assignments and description. In this case, the CRM system may be configured to work with both ASMs such that services and data relevant to an interaction event are delivered according to the prevalent ASM state for that sector of business. The same contact information and media channels may be used for both ASMs. Caller prescreening, or identifiable pre or first contact parameters may be set up to segregate events to the appropriate ASMs of the agent. For example, ASM 211a may be an ASM for product sales while ASM 211b may be an ASM for technical service. Such specific event purpose routing can be utilized with mixed queues wherein calls relevant to both ASMs may be managed in a same queue.

In still a further embodiment of the present invention, one agent (operating remotely) may service more than one enterprise through more than one contact center wherein a single third-party CRM system provides data and solutions to the agent station relative to both enterprises. To accomplish this an agent would need more than one ASM model (one for each contact center involved). The CRM system could be configured to apply appropriate data including agent scripting during live interaction so that the agent always knows before answering, which enterprise he is servicing during the interaction.

The same instance of IC/AC/CRM software may be used to interface to the CRM system and to update respective ASMs that are active for the agent. In this case, destination numbers and media channels may be the same channels for two or more contact centers sending events to the agent. Pre-routing data recorded for incoming events may be used to segregate events per ASM model and CRM responses even though destination numbers and media channels remain the same.

The method and apparatus of the present invention may be practiced on any combination of communications networks as long as events are routed through the appropriate call center equipment in at least token form.

In light of the many possible embodiments for the present invention, some of which, have already been described, the method and apparatus of the invention should be afforded the broadest interpretation under review. The spirit and scope of the present invention shall be limited only by the following claims.

What is claimed is:

1. A system for integrating a contact center, an agent station, and a customer relation management system comprising at least one server, comprising:
   a computer device coupled to the contact center, the agent station, and the customer relation management server; and
   software running on said computer device;
   wherein said software communicates with the contact center, the agent station, and the customer relation management server, making one or more dynamic states of one or more of the contact center, the agent station, and the customer relation management server available to others of the contact center, the agent station, and the customer relation management server.

2. The system of claim 1 wherein the coupling and communication are accomplished over one or both of a wide area network and a local area network.

3. The system of claim 2 wherein the wide area network is the Internet network.

4. The system of claim 1 wherein the one or more dynamic states comprise one or more of an agent status model identifying the agent, the channels of the agent, and the current presence and activity conditions of the agent in interaction relative to the channels.

5. The system of claim 1 wherein the customer relation management system is physically located within the contact center.

6. The system of claim 1 wherein the customer relation management system is a third-party-maintained system remote from the contact center.

7. The system of claim 1 wherein the one or more dynamic states may be updated from an agent station or from a contact center.

8. The system of claim 7 wherein agent state updates are pushed to the contact center and the customer relation management server according to need dependent upon current media events received at the agent station.

9. The system of claim 7 wherein agent state updates are accessed from the one or more dynamic states through a subscription to services and an agent model reporting the state or states.

10. The system of claim 1 further comprising an instance of the software running on the agent station, the instance providing agent interaction and agent control ability for manipulating agent states including an interface for interacting with customer relation services.

11. The system of claim 10 wherein the software instance is a browser plug-in or otherwise browser based wit data transferred over hypertext transfer protocol enabled network connections.

12. The system of claim 1 further comprising an instance of the software running at the contact center and adapted to provide event notification, queue management, agent state interpretation, and agent state updates.

13. The system of claim 12 wherein the software instance contains a descriptor of voice destination parameters and a descriptor of media channel destination parameters for each agent status model that describes a single or a group of agents.

14. The system of claim 1 wherein the customer relation management server accesses the agent station based on agent state detection and current need according to enterprise rules.

15. The system of claim 14 wherein the customer relation management server provides services appropriate to the state or states detected.

16. The system of claim 1 wherein the customer relation management server is accessed by the agent station based on agent state detection and current need according to enterprise rules, and orders data and or services.

17. A method for automated ordering and receipt of data and/or services provided by a customer relation management system to a communications terminal according to reported state information about live or asynchronous media events routed to the terminal comprising steps of:
  (a) routing an event or notification of the event to the communications terminal;
  (b) reporting state information related to the routed event or notification of the state information to the customer relation management system during the time of routing of the event for connection;
  (c) determining at the customer relation management system specific data and/or services needed; and
  (d) receiving at the terminal the data and/or services or a notification of availability of the data and/or services from the customer relation management system during or before a time of interaction for the event at the terminal.

18. The method of claim 17 wherein the state information is part of an agent status model and the ordering of data or services is performed at a network adapter containing the agent status model.

19. The method of claim 17 wherein in step (a) the event is one of a telephone event or a voice over IP event.

20. The method of claim 17 wherein In step (a) the event is one of an email event, a chat request event, or an instant messaging event.

21. The method of claim 17 wherein in step (a) the event is a hypertext transfer protocol request.

22. The method of claim 17 wherein in step (a) the communications terminal is an agent station comprising a computer connected to a network and at least a simulated telephone.

23. The method of claim 17 wherein in step (b) reporting is performed in a network adapter node consulting an agent status model for state information related to the routed event.

24. The method of claim 17 wherein in step (b) the state information includes one or more of the event media type, event author ID, routing source ID, routing destination ID, contact destination ID, and queue ID and position therein.

25. The method of claim 17 wherein in step (b) the state further includes pre-determined ID relevant to specific data and or services to be delivered.

26. The method of claim 17 wherein in step (c) the determination is made according to specific ID.

27. The method of claim 17 wherein in step (c) the determination is made according to a best option matching the state information of more than one option available to the customer relation management server.

28. The method of claim 17 wherein in step (b) the state information related to the routed event results from a manual change of settings from the point of the communications terminal.

29. The method of claim 28 wherein the change results in customer relation management system delivery of a solution covering more than one event described in the agent status model.

* * * * *